(12) United States Patent
Fay

(10) Patent No.: US 10,774,976 B2
(45) Date of Patent: Sep. 15, 2020

(54) SYSTEMS AND METHODS FOR INSULATING A PIPE WITH A PRE-APPLIED VAPOR-BARRIER STOP

(71) Applicant: JOHNS MANVILLE, Denver, CO (US)

(72) Inventor: Ralph Michael Fay, Lakewood, CO (US)

(73) Assignee: Johns Manville, Denver, CO (US)

( * ) Notice: Subject to any disclaimer, the term of this patent is extended or adjusted under 35 U.S.C. 154(b) by 114 days.

(21) Appl. No.: 16/128,692

(22) Filed: Sep. 12, 2018

(65) Prior Publication Data

US 2020/0080679 A1   Mar. 12, 2020

(51) Int. Cl.
*F16L 59/14* (2006.01)
*F16L 59/02* (2006.01)

(52) U.S. Cl.
CPC .......... *F16L 59/025* (2013.01); *F16L 59/029* (2013.01); *F16L 59/14* (2013.01)

(58) Field of Classification Search
CPC ..... F16L 59/021; F16L 59/022; F16L 59/024; F16L 59/029; F16L 59/14
USPC ........................................ 138/149, 156, 151
See application file for complete search history.

(56) References Cited

U.S. PATENT DOCUMENTS

| | | | | |
|---|---|---|---|---|
| 3,557,840 A * | 1/1971 | Maybee | ................ | F16L 59/026 138/149 |
| 4,748,060 A * | 5/1988 | Fry | ....................... | F16L 59/022 138/151 |
| 5,783,274 A * | 7/1998 | Knittel | ..................... | B32B 7/12 428/36.9 |
| 5,934,337 A * | 8/1999 | Fiala | ..................... | F16L 59/023 138/149 |
| 8,950,439 B2 * | 2/2015 | Dudley | ................... | E04C 2/328 138/149 |
| 2008/0206543 A1 * | 8/2008 | Whitaker | .............. | F16L 59/029 428/304.4 |

* cited by examiner

*Primary Examiner* — Patrick F Brinson
(74) *Attorney, Agent, or Firm* — Robert D. Touslee

(57) ABSTRACT

A vapor-barrier stop pre-treated piping insulation system including an insulation segment, a vapor-barrier stop, and a sealant. The insulation segment includes a cylindrical exterior surface, a cylindrical exterior surface, a first end surface, a second end surface, at least two ledge surfaces, and a wall extending between the cylindrical exterior surface and the cylindrical interior surface. The vapor-barrier stop is applied prior to installation of the insulation segment and extends, starting from at least the first end surface, over the cylindrical interior surface, the cylindrical exterior surface, the at least two ledge surfaces, and the first end surface along the insulation segment towards the second end surface. The vapor-barrier stop is configured to impede vapor-exchange through the vapor-barrier stop.

23 Claims, 8 Drawing Sheets

SYSTEMS AND METHODS FOR INSULATING A PIPE WITH A PRE-APPLIED VAPOR-BARRIER STOP

CROSS-REFERENCE TO RELATED APPLICATIONS

This application is related to U.S. patent application Ser. No. 16/129,259, entitled "SYSTEM AND METHOD FOR FIBER REINFORCED AEROGEL INSULATION" filed Sep. 12, 2018; U.S. patent application Ser. No. 16/128,886, entitled "FIBER REINFORCED AEROGEL INSULATION" filed Sep. 12, 2018; and U.S. patent application Ser. No. 16/129,005, entitled "FIBER REINFORCED AEROGEL INSULATION AND METHOD THEREFOR" filed Sep. 12, 2018. The entire disclosure of all of the aforementioned U.S. patent applications are hereby incorporated by reference, for all purposes, as if fully set forth herein.

BACKGROUND OF THE INVENTION

The subject invention relates generally to pipe insulation products and more specifically to pipe insulation products comprising a vapor-barrier stop.

Piping is often used to transport one or more fluids between destinations. For example, piping may be used to transport water, petroleum, oxygen, etc. The piping is often made from a metal material, such as copper, stainless steel, galvanized steel, aluminum, brass, titanium, etc., or from a plastic material, such as polyvinyl chloride (PVC), chlorinated polyvinyl chloride (CPVC), fiber reinforced plastic (FRP), polypropylene (PP), polyethylene (PE), etc. Piping may also be made from a ceramic, fiberglass, or concrete material, although these pipes are less common.

During fluid transportation, the fluid may be subject to heating and/or cooling from the surrounding environment. For example, the fluid may be transported in either a hot or cold state relative to the surrounding environment, which induces heat transfer to or from the fluid and pipes. HVAC systems are a common example of systems that routinely utilize various pipe configurations to transport hot or cold fluids. Due to the conductive nature of the pipes (especially metal pipes), heat may be conducted to or from the fluid during transportation. The addition or removal of heat may result in the decreased efficiency of a system and/or increased time and/or expense in operating the system. For example, in HVAC systems, the addition of heat to cooled fluids may result in loss of efficiency for a cooling unit and may also result in increased expense because of increased operating time and energy needed to achieve a desired cooling level.

In some cases, the fluid being transported is a compressed liquefied gas or a cryogenic liquid. Exemplary liquefied gases where the present technology may be useful include liquefied natural gas, liquefied ethylene, liquefied ammonia, or other fluids in their respective liquid states. For example, the present technology may be useful for transporting liquefied natural gas at about −260° F., liquefied ethylene at about −155° F., liquefied ammonia at about −28° F., etc. A cryogenic liquid is a liquid with a normal boiling point below approximately −130° F. (−90° C.). This means that at ambient conditions, the cryogenic liquid would be in a gaseous state. Generally, the otherwise gaseous fluid is compressed and chilled into a liquid state for transportation purposes.

To reduce heat transfer during fluid transportation, pipe insulation products are commonly installed on the pipes of a piping system to retard the flow of heat to and from the pipes. Commonly, one or more sections of pipe are fitted with a pipe insulation product where the sections of pipe are generally fully encased within the pipe insulation product. Common pipe insulation products comprise a fibrous insulation material that is surrounded by and encased within a laminate. Separate sections of pipe insulation product are often coupled together via adhesive tapes. The laminates of the pipe insulation product often enhance the visual appeal of the piping system and serve as a means for sealing the pipe insulation product about the pipes of the piping system. Individual segments of pipe insulation products typically range in length from about 36 inches to about 48 inches; have a wall thickness ranging from about 0.5 inches to about 3 inches; and a range in outside diameter from about 2 inches to about 32 inches. The pipe insulation product may also be used to reduce degradation and/or corrosion of the pipe.

For cryogenic piping systems, commonly referred to as cryogenic trains, insulating the sections of pipe is necessary due to the extremely low temperatures of the cryogenic liquid required to be maintained during transportation. However, insulating cryogenic trains can be challenging due to the particular characteristics of cryogenic liquids. Not only are cryogenic liquids difficult to transport because of their extremely low temperatures (often −100° F. to −260° F., or −73° C. to −162° C.), but many cryogenic liquids are also flammable or combustible. For example, commonly transported cryogenic liquids include methane, liquefied natural gas (LNG), and oxygen.

A primary challenge of insulating cryogenic trains is the extreme temperature differential between the cryogenic liquid being transported and the ambient air. A higher temperature differential results in a higher rate of heat loss. A high rate of heat loss is likely to result in higher inefficiencies of the overall system and may increase the risk of vaporization. Without adequate insulation, the cryogenic liquid is at risk of heating up and vaporizing as a result of the temperature increase. The volume of a cryogenic liquid, for example liquefied natural gas (LNG) can be up to $\frac{1}{600}^{th}$ of the volume of the natural gas in the gaseous state. Thus, vaporization of the cryogenic fluid back to its gaseous state while still inside of the pipe is likely to result in damage to the piping system, and may result in damage to any upstream or downstream equipment connected to the piping system.

Insulation systems for below-ambient conditions must be designed to be vapor tight. This is particularly true for insulation systems that are designed for use in cryogenic operating temperatures. Water intrusion into the system may degrade the performance of the insulation system and can lead to other problems. For example, condensation is likely to form on any exposed pipe because of the extreme temperature differential between the cryogenic liquid and ambient air. Ambient air will condense on surfaces that are below the dew point of the ambient air. Since cryogenic trains operate well below the ambient air dew point, condensation is a common problem. Condensation is problematic because it can adversely impact the quality of the piping material, in some cases causing corrosion. Additionally, condensation is likely to damage the insulation segments jacketing the pipe. Once a section of insulation comes into contact with condensation, the condensation is likely to move laterally down the insulation segment, expanding the overall range of damage to the insulation system.

Moisture intrusion can also lead to ice formation within the insulation system and/or ice formation on the pipe itself. Ice formation within the insulation system is likely to reduce the system efficiency and degrade the insulation system performance. Ice formation also adds unwanted weight to the piping system that can lead to equipment damage if the weight exceeds the load capacities of the supports or equipment.

Leaks in the vapor barrier of the insulation are another source of moisture intrusion common for insulation systems. It is likely that a vapor barrier system is going to leak at some point in its lifetime. The leak can be a pinhole or larger rupture that permits moisture vapor into the closed system that will be absorbed by the insulation segments, condense as water in the voids between joints and layers, freeze and expand and lead to degradation of the insulation system's performance. Again, once the leak is absorbed by the insulation system, it is likely to move laterally as vapor or liquid down the pipe, extending the range of damage to the insulation system.

Piping interruptions are a primary source of moisture intrusion risk for a piping system. All insulation systems, including cryogenic trains, have piping interruptions. A piping interruption is any break or component that breaks an otherwise straight run of piping. Common piping interruptions include piping elbows or tees, valves, flanges, piping termination points, piping supports, and inline instruments. Even if the piping run is straight without interruption, if the piping run is 18 or more feet long, a contraction joint is typically required. A contraction joint is also a type of piping interruption. This means, that for almost all piping systems, a piping interruption occurs every 18 feet or less on a pipe.

Vapor-barrier stops are applied to insulation segments at piping interruption points to isolate the insulation segment at piping interruptions to ensure any break in the insulation system or damage to the insulation system does not allow for lateral movement of any vapor or fluid down the pipe, which may compromise the entire insulation system. Vapor-barrier stops are applied to the pipe and overlap the insulation. Commonly, vapor-barrier stops are constructed using adhesives and sealants imbedded with a fabric scrim to reinforce the stop. The vapor-barrier stops are commonly adhered to and integrated with any vapor barrier jacket to maintain a continuous vapor barrier system. Additional vapor control layers and protective metal jacket are then, generally, applied over the insulated piping with vapor-barrier stops.

In cryogenic situations, such as liquefied natural gas, gas is gathered, compressed into a liquid form and sent out to a storage tank. From the storage tank the liquefied gas is then pumped out to a ship for exportation. Often a single train is at least a mile long. Since insulating the entire train is necessary due to the temperature requirements of cryogenic systems, vapor-barrier stops are required at least every 18 feet along the entirety of the train.

Generally, every year approximately 5% or more of sub-ambient piping systems insulation will need to be replaced due to condensation, leaks, or other damage to the insulation system. By employing vapor-barrier stops, the damage to the insulation system is limited to the segment of insulation between the two vapor-barrier stops. Instead of allowing a leak or condensation to travel down the entirety of a piping section, which can be up to a mile long, the damage is contained to a length of insulation between vapor barrier stops of approximately 18 feet or less.

On a typical job site, when an piping interruption is encountered, a vapor-barrier stop is applied. Often times piping interruptions are located in hard to reach areas. Thus, to apply a vapor-barrier stop in the field, scaffolding, or other equipment, is often required simply to reach the piping interruption. Additionally, the geographical location of facilities that the piping systems are connected to tend to be in isolated regions, often areas where extreme weather conditions are common. For example, many LNG facilities are located in coastal areas such as southern Texas along the Gulf of Mexico. Thus, workers installing vapor-barrier stops at the job sites are often exposed to high humidity and hot conditions during installation.

Skilled labor is generally required to apply vapor-barrier stops in the field. Facilities often encounter issues of limited workers available who have the skills necessary to install vapor-barrier stops on-site. Of the workers that a facility is able to find, many of these workers do not have the required skills or experience to adequately apply the vapor-barrier stops. This lends to issues of botched or misapplied vapor-barrier stops.

BRIEF DESCRIPTION OF THE INVENTION

The vapor-barrier stop pre-treated piping insulation system of the present invention provides superior application of a uniform vapor barrier, reduces installation time, provides easy customization to a variety of insulation systems, and minimizes labor requirements and costs during installation. The vapor-barrier stop pre-treated piping insulation system of the present invention may include a piping section and an insulation segment. The insulation segment may include a length and a longitudinal axis, a substantially cylindrical interior surface, a substantially cylindrical exterior surface, a first end surface, a second end surface, and a wall extending between the cylindrical exterior surface and the cylindrical interior surface. The wall may include a radially extending thickness and a slit extending parallel to the longitudinal axis for the length of the insulation segment and extending completely through the wall from the cylindrical exterior surface to the cylindrical interior surface. The slit may include at least two ledge surfaces.

The vapor-barrier stop pre-treated piping insulation system may also include a vapor-barrier stop applied prior to installation of the insulation segment. The vapor-barrier stop may extend over the insulation segment, starting from at least the first end surface, and extending over the cylindrical interior surface, the cylindrical exterior surface, the at least two ledge surfaces, and at least the first end surface to a set length along the insulation segment. The vapor-barrier stop may impede vapor exchange through the insulation segment. The vapor-barrier stop pre-treated piping insulation system may also include a sealant applied to provide a seal at least between the insulation segment and the piping section. The sealant may also provide a seal at least between the ledge surfaces. The sealant may include a 100% solid sealant.

The cylindrical exterior surface may include a vapor-barrier facer. The vapor-barrier stop may ideally overlap and seal onto the vapor-barrier facer to create a continuous vapor barrier. The insulation segment may include a plurality of insulation pieces configured to nest together to form the insulation segment. At least one of the at least plurality of insulation pieces may include a vapor-barrier facer. The plurality of insulation pieces may be configured to nest together in a stair step fashion to form the insulation segment.

The vapor-barrier stop pre-treated piping insulation system may include a second insulation segment and the insulation segment may be a first insulation segment. The second insulation segment may include a length, a longitudinal axis, a second substantially cylindrical interior surface, a second substantially cylindrical exterior surface, a primary end surface, a secondary end surface, and a second wall extending between the second cylindrical interior surface and the second cylindrical exterior surface. The second wall may include a radially extending thickness and a second slit extending parallel to the longitudinal axis for the length of the second insulation segment and extending completely through the second wall from the second cylindrical exterior surface to the second cylindrical interior surface. The second slit may include at least two shelf surfaces.

The vapor-barrier stop pre-treated piping insulation system may also include a second vapor-barrier stop applied prior to installation of the second insulation segment. The second vapor-barrier stop may extend over the second insulation segment starting at least at the primary end surface and extending over the second cylindrical interior surface, the second cylindrical exterior surface, the at least two shelf surfaces, and at least the primary end surface to a distance along the length of the second insulation segment. The second vapor-barrier stop may impede vapor exchange through the second vapor-barrier stop. The vapor-barrier stop pre-treated piping insulation system may include a second sealant applied to provide a seal between the second insulation segment and the first insulation segment.

The present invention may also include an insulation segment with a pre-applied vapor-barrier stop. The insulation segment may include a length, a diameter, a longitudinal axis, a substantially cylindrical interior surface, a substantially cylindrical exterior surface, a first end surface, a second end surface, and a wall extending between the cylindrical exterior surface and the cylindrical interior surface. The wall may include a radially extending thickness and a slit extending parallel to the longitudinal axis for the length of the insulation segment and extending completely through the wall from the cylindrical exterior surface to the cylindrical interior surface. The slit may include at least two ledge surfaces.

The insulation segment with a pre-applied vapor-barrier stop may also include a vapor-barrier stop applied prior to installation of the insulation segment. The vapor-barrier stop may extend over the insulation segment, starting from at least the first end surface and extending over the cylindrical interior surface, the cylindrical exterior surface, the at least two ledge surfaces, and at least the first end surface to a distance along the length of the insulation segment. The vapor-barrier stop may impede vapor exchange through the vapor-barrier stop.

The vapor-barrier stop may include a first layer of vapor-barrier material, a reinforcing fabric imbedded in the first layer of vapor-barrier material, and a second layer of vapor-barrier material that may be positioned atop the first layer. The insulation segment may be configured to install with a sealant to seal the insulation segment. The cylindrical exterior surface may include a vapor-barrier facer. The vapor-barrier stop may ideally overlap and seal onto the vapor-barrier facer to create a continuous vapor barrier. The insulation segment may include at least a plurality of insulation pieces configured to nest together to form the insulation segment. At least one of the at least plurality of insulation pieces may include a vapor-barrier facer. The insulation pieces may be configured to nest together in a stair step fashion to form the insulation segment.

The second layer of vapor-barrier material may also include a second reinforcing fabric imbedded in the second layer of the vapor-barrier material. The vapor-barrier material may include a resin material. The resin material may include a mastic. The resin material may also include a butyl polymer.

The diameter of the insulation segment taken from over the cylindrical exterior surface may remain substantially the same as a diameter of the insulation segment extended over the cylindrical exterior surface by the vapor-barrier stop. The diameter of the insulation segment extended over the cylindrical exterior surface by the vapor-barrier stop may remain substantially the same as the diameter of the insulation segment taken over the cylindrical exterior surface when the diameter of the insulation segment extended over the cylindrical exterior surface by the vapor-barrier stop is about 0.12 inches greater than the diameter of the insulation segment taken over the cylindrical exterior surface.

The present invention may also include a method for pre-treating an insulation segment with a vapor-barrier stop. The method may include providing an insulation segment having a length and a longitudinal axis, a substantially cylindrical interior surface, a substantially cylindrical exterior surface, a first end surface, a second end surface, and a wall extending between the cylindrical exterior surface and the cylindrical interior surface. The wall may include a radially extending thickness and a slit extending parallel to the longitudinal axis for the length of the insulation segment and extending completely through the wall from the cylindrical exterior surface to the cylindrical interior surface. The slit may include at least two ledge surfaces.

The method may also include applying a vapor-barrier stop prior to installation of the insulation segment on a piping section. The vapor-barrier stop may extend over the insulation segment starting from at least the first end surface and extending over the cylindrical interior surface, the cylindrical exterior surface, the ledge surfaces, and at least the first end surface to a distance along the length of the insulation segment. The vapor-barrier stop may impede vapor exchange through the vapor-barrier stop. The method may include drying the vapor-barrier stop.

The method of applying the vapor-barrier stop may include coating the insulation segment with a vapor-barrier material. The method of applying the vapor-barrier stop may also include dipping the insulation segment into a vapor-barrier material. The method of applying the vapor-barrier stop may include applying a first layer of vapor-barrier material, imbedding a reinforcing fabric into the first layer of vapor-barrier material, and applying a second layer of vapor-barrier material over the first layer of vapor-barrier material imbedded with the reinforcing fabric. The method of applying the vapor-barrier stop may also include imbedding a second reinforcing fabric into the second layer of vapor-barrier material.

The present invention may include a method for installing an insulation segment with a pre-applied vapor-barrier stop. The method may include jacketing at least a portion of a piping section with an insulation segment and sealing the insulation segment about the piping section with a sealant. The method of jacketing at least a portion of the piping section may include nesting together a plurality of insulation pieces to form the insulation segment. The insulation pieces may be configured to nest together to form the insulation segment. The method of sealing the insulation segment may include applying the sealant to provide a seal between the insulation segment and the piping section.

The insulation segment may include a length, a longitudinal axis, a substantially cylindrical interior surface, a substantially cylindrical exterior surface, a first end surface, a second end surface, and a wall extending between the cylindrical exterior surface and the cylindrical interior surface, and a vapor-barrier stop applied prior to jacketing the piping section with the insulation segment. The wall may include a radially extending thickness and a slit extending parallel to the longitudinal axis for the length of the insulation segment and extending completely through the wall from the cylindrical exterior surface to the cylindrical interior surface. The slit may include at least two ledge surfaces.

The vapor-barrier stop may extend over the insulation segment, starting from at least the first end surface and may extend over the cylindrical interior surface, the cylindrical exterior surface, the at least two ledge surfaces, and at least the first end surface to a distance along the length of the insulation segment. The vapor-barrier stop may impede vapor exchange through the vapor-barrier stop.

The method of installing the insulation segment with a pre-applied vapor-barrier stop may also include jacketing the insulation segment that is a first insulation segment with a second insulation segment and sealing the second insulation segment about the first insulation segment with a sealant. The sealant may be applied to provide a seal between the second insulation segment and the first insulation segment.

The second insulation segment may include a length, a longitudinal axis, a second substantially cylindrical interior surface, a second substantially cylindrical exterior surface, a primary end surface, a secondary end surface, a second wall extending between the second cylindrical exterior surface and the second cylindrical interior surface, and a second vapor-barrier stop applied prior to jacketing the first insulation segment with the second insulation segment. The second wall may include a radially extending thickness and a second slit extending parallel to the longitudinal axis for the length of the second insulation segment and extending completely through the second wall from the second cylindrical exterior surface to the second cylindrical interior surface. The second slit may include at least two shelf surfaces.

The second vapor-barrier stop applied prior to jacketing the first insulation segment with the second insulation segment may extend over the second insulation segment, starting from at least the primary end surface and extending over the second cylindrical interior surface, the second cylindrical exterior surface, the at least two shelf surfaces, and at least the primary end surface to a distance along the length of the second insulation segment. The second vapor-barrier stop may impede vapor exchange through the second vapor-barrier stop.

BRIEF DESCRIPTION OF THE DRAWINGS

The present invention is described in conjunction with the appended figures.

Figure 1:
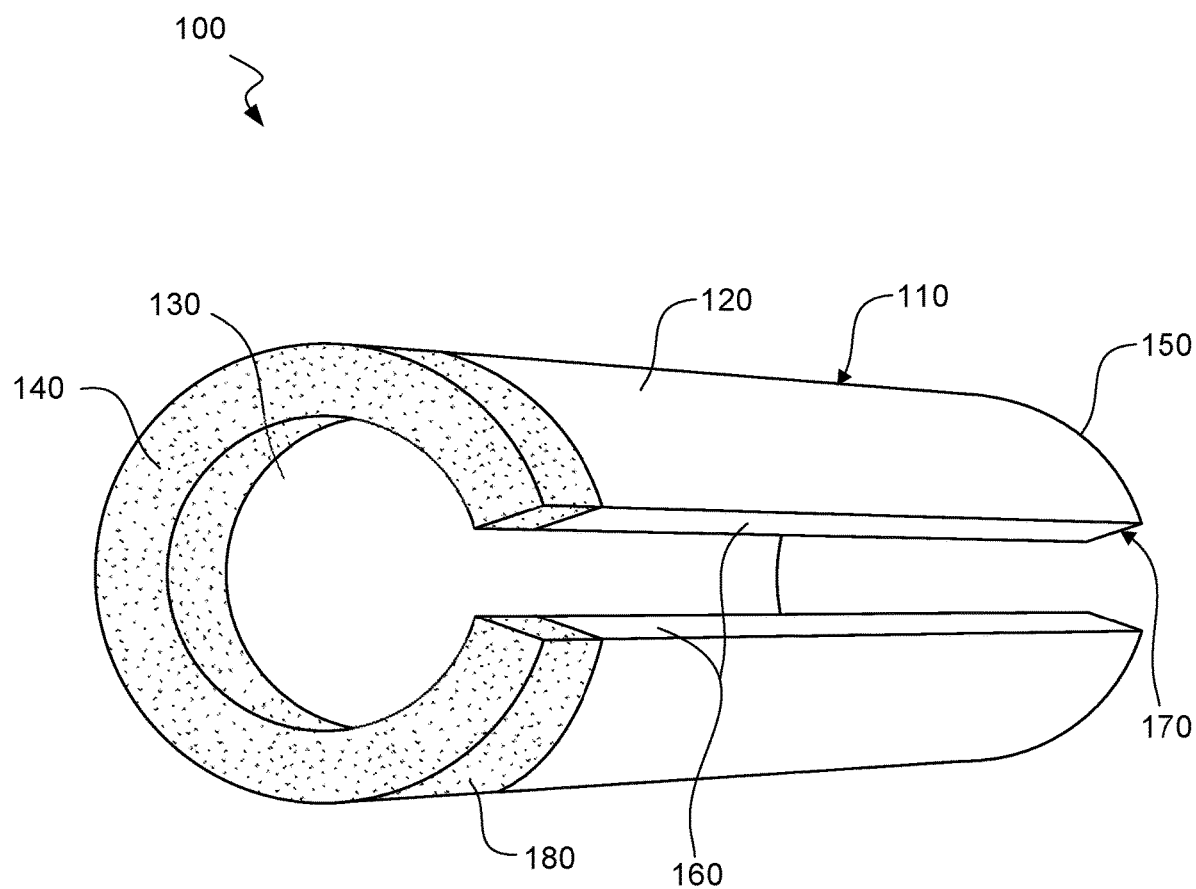
FIG. 1 is an schematic perspective view of an insulation segment, wherein the insulation segment comprises a pre-applied vapor-barrier stop of the present invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The present invention relates to a vapor-barrier stop that is pre-applied to an insulation segment prior to installation of the insulation segment about a piping section. Conventionally, vapor-barrier stops are applied at the job site by a worker. To install the vapor-barrier stop in the field, skilled labor is required. Application of the vapor-barrier stop to an insulation segment in the field takes time because after a first layer of the vapor-barrier material is applied, typically a mastic, and a fabric scrim is imbedded in the first layer, the vapor-barrier material must dry before application of a second layer. Typically, a worker will apply the first layer and imbed the fabric skim one day, and then return the following day to apply the second layer.

Conditions at the job site also impact the application of the vapor-barrier stop. As many job sites are located in coastal regions, for example Corpus Christi, Tex., ambient conditions may involve high humidity and temperatures or even rain. Such conditions may impact the drying processing of the mastic and impact the overall quality of the vapor-barrier stop applied. The level of worker skill during application of the vapor-barrier stop also impacts the quality of the vapor-barrier stop. Often, skilled labor knowledgeable in the area of vapor-barrier stop application is difficult to find and can result in defective applications of vapor-barrier stops. Due to the nature of vapor intrusion, any defects in the vapor-barrier stop render the entire stop inoperable. Any break in the continuous vapor-barrier material allows vapor to intrude and contact the underlying insulation segment.

The present invention provides application of the vapor-barrier stop in a controlled environment. For example, by applying the vapor-barrier stop in a factory setting, application conditions from the humidity to the temperature can be controlled. By controlling the conditions under which a vapor-barrier stop is applied to an insulation segment, uniformity and continuity of the vapor-barrier material application can be ensured. Closely monitoring the drying temperature and conditions during application allows for a defect-free vapor-barrier stop that provides a continuous barrier to vapor.

An important feature of a vapor-barrier stop is low vapor permeance to prevent condensation on pipes, which could lead to mold growth, water damage, ice formation, dripping water damage, staining, loss of insulation performance, pipe corrosion, etc. It is preferable that a vapor-barrier stop have a permenance of 0.01 perm or less. The vapor-barrier stop of the present invention exhibits uniformity of application, enhanced protection against vapor intrusion, and a reduction in installation costs and time, while allowing for easy customization to a wide variety of insulation systems and applications.

As shown in FIG. 1, an insulation segment 100 may include a tubular core of an insulating material 110 that may include a substantially cylindrical exterior surface 120 (i.e., the outside of the tubular core that faces outward from an underlying piping section) and a substantially cylindrical interior surface 130. Extending between the cylindrical exterior surface 120 and the cylindrical interior surface 130 may be a wall of insulating material. The insulating material provides the insulation properties of the insulation segment 100. In one embodiment, the insulating material may be a fibrous material (e.g., fiberglass, cellular glass, mineral wool, refractory ceramic fiber, chopped stranded fiber glass, etc.). In other embodiments, the insulating material may be a foam (e.g., phenolic foam, polyisocyanurate, polyolefin, polystyrene, polyurethane), a polymer, foam glass, microporous insulation (e.g., Microtherm®), or any other material that provides insulation.

The cylindrical interior surface 130 may be configured to correspond with a specific pipe section exterior diameter (e.g., 10 inch, 30 inch, etc.). The tubular core 110 may also include a longitudinally extending slit 170 that passes completely through the wall of the insulating material on one side and into the interior of the substantially cylindrical interior surface 130 so that the tubular core 110 can be opened, and passed over, and closed about a piping section. In some embodiments, the slit 170 may allow the tubular core 110 to conform about a piping section.

The tubular core of insulating material 110 may comprise at least two ledge surfaces 160. When encasing a piping section with the insulation segment 100, corresponding ledge surfaces 160 may come together and contact each other to completely close the tubular core 110 about the piping section. The ledge surfaces 160 may exist along each slit 170 that extends along the length of the tubular core 110. In some embodiments, there may be more than one slit 170, and each slit 170 may correspond to at least two ledge surfaces 160.

In some embodiments, the cylindrical exterior surface 120 may comprise a vapor-barrier facer, also known as a vapor-barrier retarder. The vapor-barrier facer may be part of the tubular core 110. In other embodiments, the vapor-barrier facer may be a separate component that is installed or applied over the cylindrical exterior surface 120 prior to application of the vapor-barrier stop. In some embodiments, particularly those involving cryogenic piping systems, the cylindrical exterior surface 120 may not have a vapor-barrier facer, or only a portion of the cylindrical exterior surface 120 may have a vapor-barrier facer. In some embodiments, multiple insulation cores may be implemented in a nested manner, such as the system shown in FIG. 8 and discussed below. In those embodiments, a vapor-barrier facer may be provided on the outer most layer of the insulation cores, and/or may also be provided on one or more of the inner layers of the insulation cores. In some embodiments, none of the nested insulation cores may include a vapor-barrier facer.

When a vapor-barrier facer exists on the cylindrical exterior surface 120, the vapor-barrier stop 180 pre-applied to the tubular core 110 ideally overlaps and seals onto the vapor-barrier facer to form a continuous vapor barrier. Similar to a vapor-barrier stop, the vapor-barrier facer is meant to impede vapor intrusion. In some embodiments, the vapor-barrier facer may have a permeance level between 0.01 perm and 0.1 perm. In other embodiments, the vapor-barrier facer may have a permeance level less than 0.01 perm.

Circumferentially surrounding and encasing at least one end of the tubular core 110 is a vapor-barrier stop 180. The vapor-barrier stop 180 continuously encases at least the first end surface 140 of tubular core 110 and longitudinally extends along the length towards the second end surface 150 of the tubular core 110 to a distance, parallel to the slit 170. The vapor-barrier stop 180, starting from and including the first end surface 140, roughly co-extensively extends over the cylindrical interior surface 130, the cylindrical exterior surface 120, and at least the two ledge surfaces 160 to a distance along the length of the tubular core 110. This results in the vapor-barrier stop 180 encapsulating at least the first end of the tubular core 110 in a continuous layer of vapor-barrier material.

In some embodiments, the second end surface 150 of tubular core 110 is also pre-treated with a vapor-barrier stop 180. The vapor-barrier stop 180 may extend over the second end surface 150 and may roughly co-extensively extend over the cylindrical interior surface 130, the cylindrical exterior surface 120, and at least the two ledge surfaces 160 extends along the length of tubular core 110 towards the first end surface 140, paralleling the slit 170. In other embodiments, the vapor-barrier stop 180 may be applied to both ends of the tubular core 110, to only the first end of the tubular core 110, or to only the second end of the tubular core 110.

The vapor-barrier stop 180 of the present invention may include one or more layers of vapor-barrier material. The vapor-barrier material may comprise a resin. In some embodiments, the resin material may comprise a mastic. Examples of mastics that may be used, depending on the application, include a butyl polymer or a Childers Vapor Barrier Mastic such as, for example, Childers CP-35, Childers CP-30, Childers CP-76, or Mon Eco 55-10.

A reinforcing fabric may be imbedded in the individual layers of vapor-barrier material. Prior to the vapor-barrier material drying or curing, a reinforcing fabric may be imbedded into the first layer of vapor-barrier material. In some embodiments, the vapor-barrier material is applied to the tubular core 110 and the reinforcing fabric may be imbedded directly into the uncured or not-yet dried vapor-barrier material. In other embodiments, the vapor-barrier material may be co-applied (e.g., simultaneously applied) with the reinforcing fabric. For example, the vapor-barrier material may be applied using a spray technique co-applied with reinforcing fabric fibers or shrink wrapping film around the end surfaces of the tubular core 110.

The reinforcing fabric may be a fiber mesh, fabric scrim, fabric fibers, film, or gauze, including cotton gauze, and so on. The fabric fibers may be applied in an aerosol form. The reinforcing fiber may comprise one or more of polypropylene, polyester, glass fiber, cotton fiber, etc. In some embodiments, no reinforcing fabric is imbedded into the layer of vapor-barrier material. A vapor-barrier stop 180 comprising at least two layers of vapor-barrier material is preferred because it assures creation of a uniform and effective vapor barrier.

It is important to note that the vapor-barrier stop 180 must not significantly change the dimension of the treated end of the tubular core 110. The exterior diameter of the tubular core 110 extended over by the vapor-barrier stop 180 must be substantially similar to the diameter of the insulation segment 100 taken over the cylindrical exterior surface 120. In some embodiments, to obtain a diameter of the applied vapor-barrier stop that is substantially similar to the diameter of the insulation segment 100, the thickness of the vapor-barrier stop 180 applied to the insulation segment 100 may be about 0.060 inches. In other words, the diameter of the insulation segment 100 extended over the cylindrical exterior surface 120 by the vapor-barrier stop 180 may be substantially the same as the diameter of the insulation segment 100 taken over the cylindrical exterior surface 120 when the diameter of vapor-barrier stop 180 is about 0.12 inches greater than the diameter of the insulation segment 100 taken over the cylindrical exterior surface 120. Since many of the insulations that benefit from having a pre-applied vapor stop are cut to shape from large blocks in a fabrication shop, they can also be fabricated to include slightly less insulation reduced by a thickness that is approximately equal to the vapor barrier stop thickness in the areas that will have the pre-applied vapor stops applied.

Figure 2A:
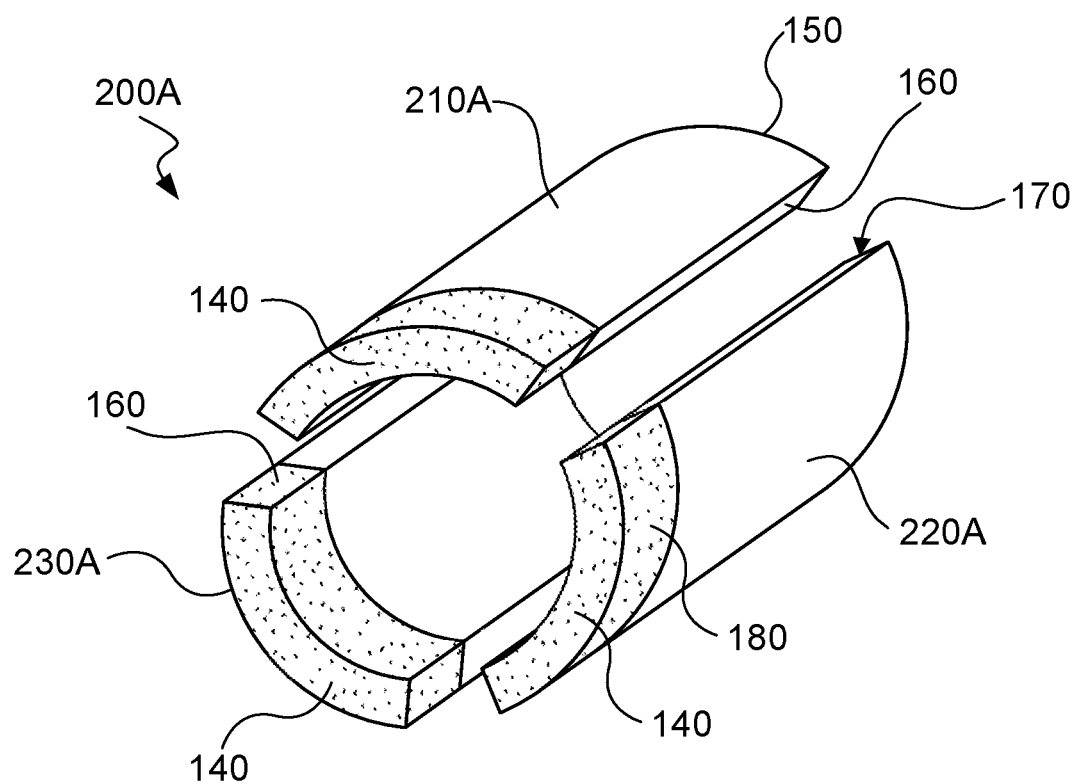
FIG. 2A is a schematic perspective view of a plurality of insulation pieces nested together to form an insulation segment.

FIG. 2A depicts an insulation segment 200A according to one embodiment of the present invention. Some or all of the components and embodiments discussed in other Figures may be present in FIG. 2A. FIG. 2A illustrates that the insulation segment 200A may be comprised of multiple insulation pieces 210A, 220A, and 230A. The insulation segment 200A may contain some or all of the properties and characteristics of insulation segment 100. In some embodiments, the insulation segment 200A may comprise two clam shell insulation pieces configured to nest together to form the tubular core 110. While in other embodiments, the insulation segment 200A may comprise quadrants or a plurality of insulation pieces that are configured to nest together to form the tubular core 110. The plurality of insulation pieces may be configured to nest together in a stair step fashion or in a similar fashion to form the insulation segment 200A. By providing insulation pieces that are configured to nest together to form the tubular core of insulating material 110, individual insulation pieces may be offered to consumers as stand-alone SKUs or in mixed boxes with regular piping insulation sections (similar to the Johns Manville EasyFit® model). This allows for easy customization and application of piping insulation and vapor-barrier stops to a wide variety of piping system configurations.

As illustrated in FIG. 2A, the insulation pieces 210A, 220A, and 230A may be configured to nest together. When nested together, the insulation pieces 210A, 220A, and 230A may form the tubular core of an insulating material 110 that extends longitudinally along a piping section. Similar to the embodiments discussed with regards to FIG. 1, the tubular core of insulating material 110 may extend between the cylindrical exterior surface 120 and the cylindrical interior surface 130. In some embodiments, each of insulation pieces 210A, 220A, and 230A may include a substantially cylindrical exterior surface 120, which may include a vapor-barrier facer.

The tubular core of insulating material 110 comprised of the nested insulation pieces 210A, 220A, and 230A may include three longitudinally extending slits 170 that pass completely through the wall of the insulating material at various points and into the interior of the substantially cylindrical interior surface 130 so that the tubular core 110 can be formed about the piping section. In some embodiments, the slits 170 may allow the insulation pieces 210A, 220A, and 230A to nest together about a piping section to form a completed tubular core of insulating material 110.

Each insulation piece 210A, 220A, and 230A may include at least two ledge surfaces 160. Corresponding ledge surfaces 160 of two insulation pieces, for example 210A and 220A, may come together and contact one another when nested to form the tubular core of insulating material 110. The slit 170 may be the division between the insulation pieces 210A, 220A, and 230A along which the respective ledge surfaces 160 of each insulation pieces are located. Each slit 170 may include at least two respective ledge surfaces 160.

In some embodiments, each of the insulation pieces 210A, 220A, and 230A may include a first end surface 140 and a second end surface 150. Circumferentially surrounding and encasing at least one end of an insulation piece 210A, 220A, and 230A may be a vapor-barrier stop 180. For a given insulating piece, for example the insulation piece 210A, the vapor-barrier stop 180 may continuously encase the first end surface 140 of insulation piece 210A and longitudinally extend along the length of the insulation piece 210A towards the second end surface 150, parallel to the slit 170. The vapor-barrier stop 180, starting from and including the first end surface 140, may roughly co-extensively extend over the cylindrical surface 130, the cylindrical exterior surface 120, and at least the two ledge surfaces 160 of the insulation piece 210A to a distance along the length of the insulation piece 210A.

In some embodiments, the second end surface of 150 of an insulation piece, for example 210A, may also be pre-treated with a vapor-barrier stop 180 that extends over the second end surface 150, and may roughly co-extensively extend over the cylindrical interior surface 130, the cylindrical exterior surface 120, and at least the two edge surfaces 160 along the length of the insulation piece 210A towards the first end surface 140, paralleling the slit 170. In some embodiments, both end surfaces of the insulation piece 210A, 220A, and 230A may be pre-treated with a vapor-barrier stop 180. One or more of the insulation pieces 210A, 220A, and 230A may be pre-treated with a vapor-barrier stop 180 on at least one end surface. In other embodiments, both end surfaces are pre-treated with the vapor-barrier stop 180.

Figure 2B:
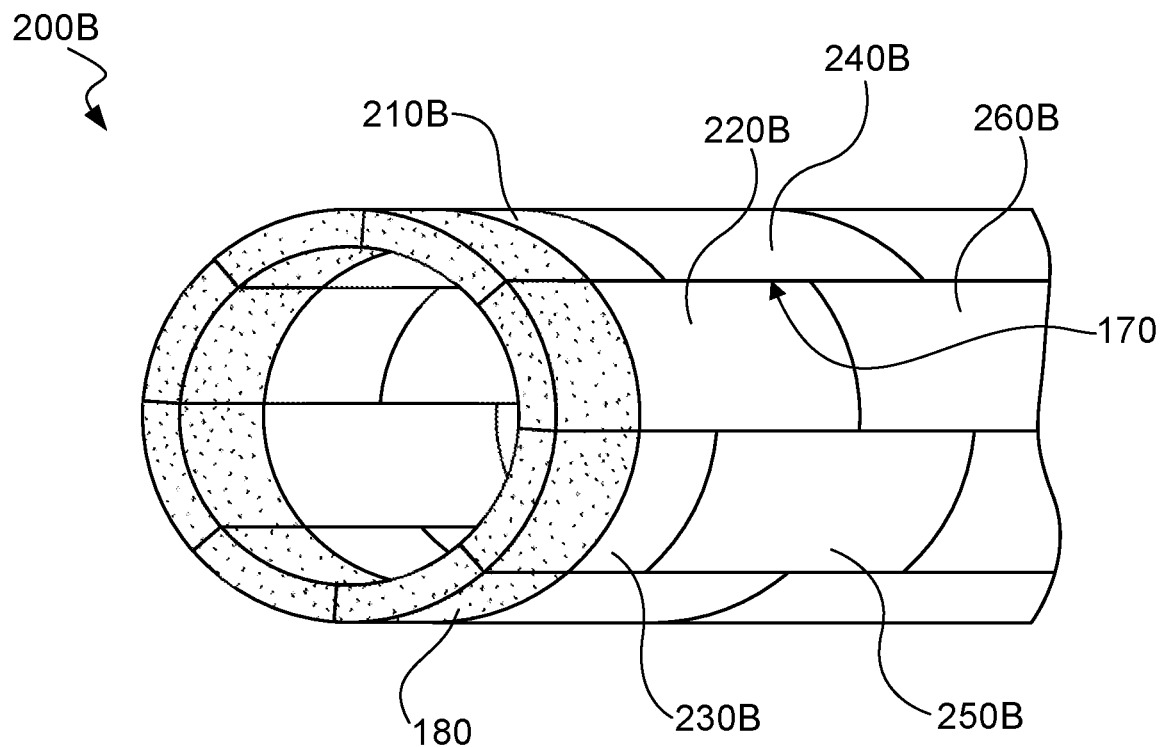
FIG. 2B is a schematic perspective view of a plurality of insulation pieces nested together to form an insulation segment.

FIG. 2B illustrates another embodiment of the insulation segment 200B pre-treated with the vapor-barrier stop of the present invention. Some or all of the embodiments and components discussed in other Figures may be present in FIG. 2B. FIG. 2B shows that insulation segment 200B may comprise a plurality of insulation pieces 210B, 220B, 230B, 240B, 250B, and 260B. When nested together, the insulation pieces 210B, 220B, 230B, 240B, 250B, and 260B may form a tubular core of insulating material 110. There may be a plurality of the insulation pieces and the depicted number of insulation pieces 210B, 220B, 230B, 240B, 250B, and 260B is for illustrative purposes only. The number of insulation pieces necessary to form a completed tubular core of insulating material 110 is dependent on the size and diameter of piping section that the tubular core 110 is required to insulate.

In some embodiments, the insulation pieces 210B, 220B, 230B, 240B, 250B, and 260B are configured in a stair step fashion to form a completed tubular core of insulating material 110. Other configurations of nesting together the insulation pieces may be used as well to form the tubular core of insulating material 110.

In some embodiments, some or all of the insulation pieces 210B, 220B, 230B, 240B, 250B, and 260B may include at least a first end surface 140. In other embodiments, only some of the insulation pieces may include at least a first end surface 140. For example, as shown in FIG. 2B, the insulation pieces 210B, 220B, and 230B include a first end surface 140. However, the insulation pieces 240B, 250B, and 260B do not include a first end surface 140 nor do the insulation pieces 240B, 250B, and 260B include a second end surface 150. Additional insulation pieces, not depicted, may include a second end surface 150.

The insulation pieces 210B, 220B, and 230B that include a first end surface 140 may be pre-treated with a vapor-barrier stop 180. The insulation pieces that nest together to form the first end surface 140 of the tubular core of insulating material 110 may all be pre-treated with a vapor-barrier stop 180 to create a continuous vapor barrier about the first end of the tubular core 110. In some embodiments, the second end surface 150 of the tubular core of insulating material 110 may also be pre-treated with a vapor-barrier stop 180. In such embodiments, the insulation pieces that nest together to form the second end surface 150 of the tubular core of the insulating material 110 (not shown), may also be pre-treated with a vapor-barrier stop 180 to create a continuous vapor barrier about the second end of the tubular core 110. In other embodiments, both ends of the tubular core of insulating material 110 may be treated with a vapor-barrier stop 180. While in other embodiments, only one end of the tubular core of insulating material 110 may include a vapor-barrier stop 180.

Similar to previously discussed embodiments, the tubular core of insulating material 110 may include a plurality of slits 170 dividing the insulation pieces 210B, 220B, 230B, 240B, 250B, and 260B from one another and each insulation piece 210B, 220B, 230B, 240B, 250B, and 260B may include at least two ledge surfaces 160. In some embodiments, a single insulation piece, for example insulation piece 250B, may include four ledge surfaces 160. In other embodiments, a single insulation piece, for example insulation piece 220B, may include three ledge surfaces 160.

Regardless of the number of ledge surfaces 160 an insulation piece may include, to form the tubular core 110 from the plurality of insulation pieces 210B, 220B, 230B, 240B, 250B, and 260B, the insulation pieces are nested together by contacting the ledge surfaces 160 of surrounding insulation pieces. For example, to form the tubular core 110 of the insulation segment 200B, the three ledge surfaces 160 of insulation piece 220B contact the ledge surfaces 160 of the surrounding insulation pieces 210B, 240B, 250B, 230B, and 260B.

Figure 3:
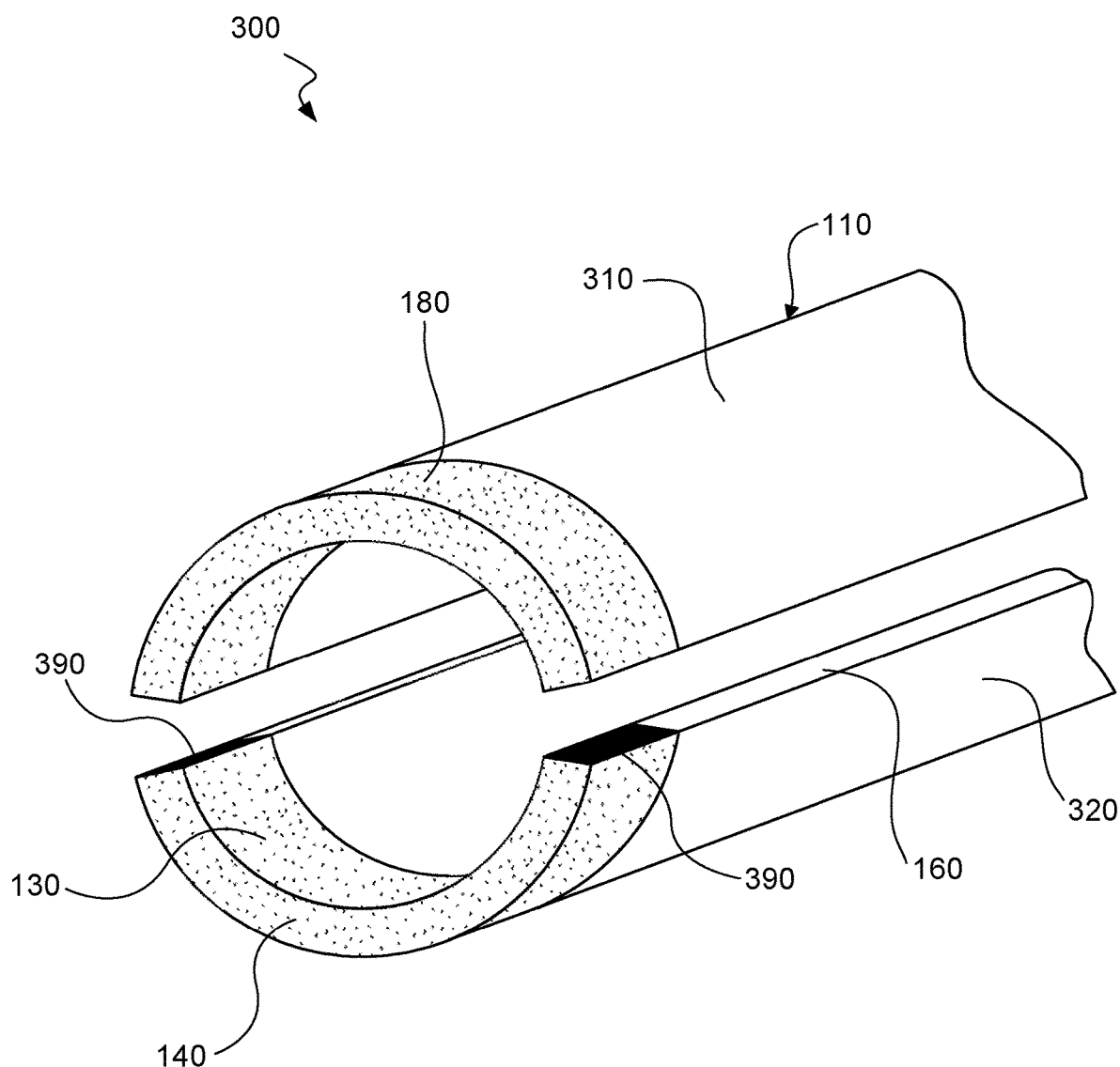
FIG. 3 is a schematic perspective view of an insulation segment with a pre-applied vapor-barrier stop of the present invention, including a sealant.

As shown in FIG. 3, to form a tubular core of insulating material 110 that may extend about a piping section, a sealant 390 may be applied to the ledge surfaces 160 to seal the ledge surfaces 160 together. Some or all of the previous embodiments and components discussed in other Figures may also be present in FIG. 3. The insulation segment 300 depicted in FIG. 3 consists of two insulation pieces 310 and 320. In some embodiments, there may be more than two insulation pieces, as for example illustrated in FIG. 2A and FIG. 2B. In other embodiments, the insulation segment 300 may be comprised of a single piece of insulation, as for example illustrated in FIG. 1.

The sealant 390 may be applied along the ledge surfaces 160 to seal two or more ledge surfaces 160 together. In some embodiments, the sealant 390 may be applied along the length of ledge surface 160 that is pre-treated with the vapor-barrier stop 180. In other embodiments, the sealant 390 may be applied along some or the entire length of ledge surface 160 or along the interior surface 130. The sealant 390 may be applied once the vapor-barrier stop 180 has dried or cured and may be applied during installation of the insulation segment 300 about a piping section. The sealant 390 as shown in FIG. 3, as well as the sealant 390 shown in FIGS. 4 and 8 discussed below, is typically applied at the jobsite as the insulation is being installed and additional, e.g., second, third, etc., insulation layers are being nested on top of each other. The jobsite sealant is applied in a fashion so that it forms a complete vapor barrier system, which substantially prevents vapor or liquid from traveling through any of the joints between any of the pipe, the surfaces of the pre-applied vapor stop 180, the matted ledge surfaces 160, and/or vapor barrier facers. In other embodiments, the sealant 390 may be applied prior to installation of insulation segment 300 about a piping section.

As illustrated in FIG. 3, the sealant 390 may be applied to a plurality of ledge surfaces 160. The sealant 390 is applied along both the ledge surfaces 160 of the insulation piece 320 to seal together the insulation pieces 310 and 320. In other embodiments, the sealant 390 may be applied to both the ledge surfaces 160 of the insulation piece 310 or to both the ledge surfaces 160 of both the insulation pieces 310 and 320. The sealant 390 is configured to seal the insulation pieces 310 and 320 together to form the tubular core 110 and provide a continuous vapor barrier.

The sealant 390 may consist of one or more sealant products. Examples of sealant products that may be used for sealant 390 include Foster® 90-61 Cryolar 1K Vapor Stop Sealant, Foster® 90-66 Cryogenic Coating/Adhesive, Foster® 30-45N FOAMSEAL™ Sealant, Foster® 95-44 Elastolar® Sealant, and Foster® 95-50 Flextra® Sealant. The sealant 390 may be applied in a single or multiple part product. For example, Foster® 90-66 Cryogenic Vapor Stop Sealant is a two-part system, which operates similar to a two-part epoxy. Specifically, two parts or two ingredients of the Foster® 90-66 Cryogenic Vapor Stop Sealant are mixed together and the mixture allows for several minutes of open time to apply before it cures to achieve optimal vapor-barrier sealing. In contrast, Foster® 95-50 Flextra® Sealant is a single component sealing product. In preferred embodiments, the sealant 390 may include one or more 100% solid sealant because 100% solid sealants eliminate the wait time needed for drying the sealant before moving on to the next installation steps. Thus, selecting a 100% sealant for sealant 390 may reduce installation time.

Figure 4:
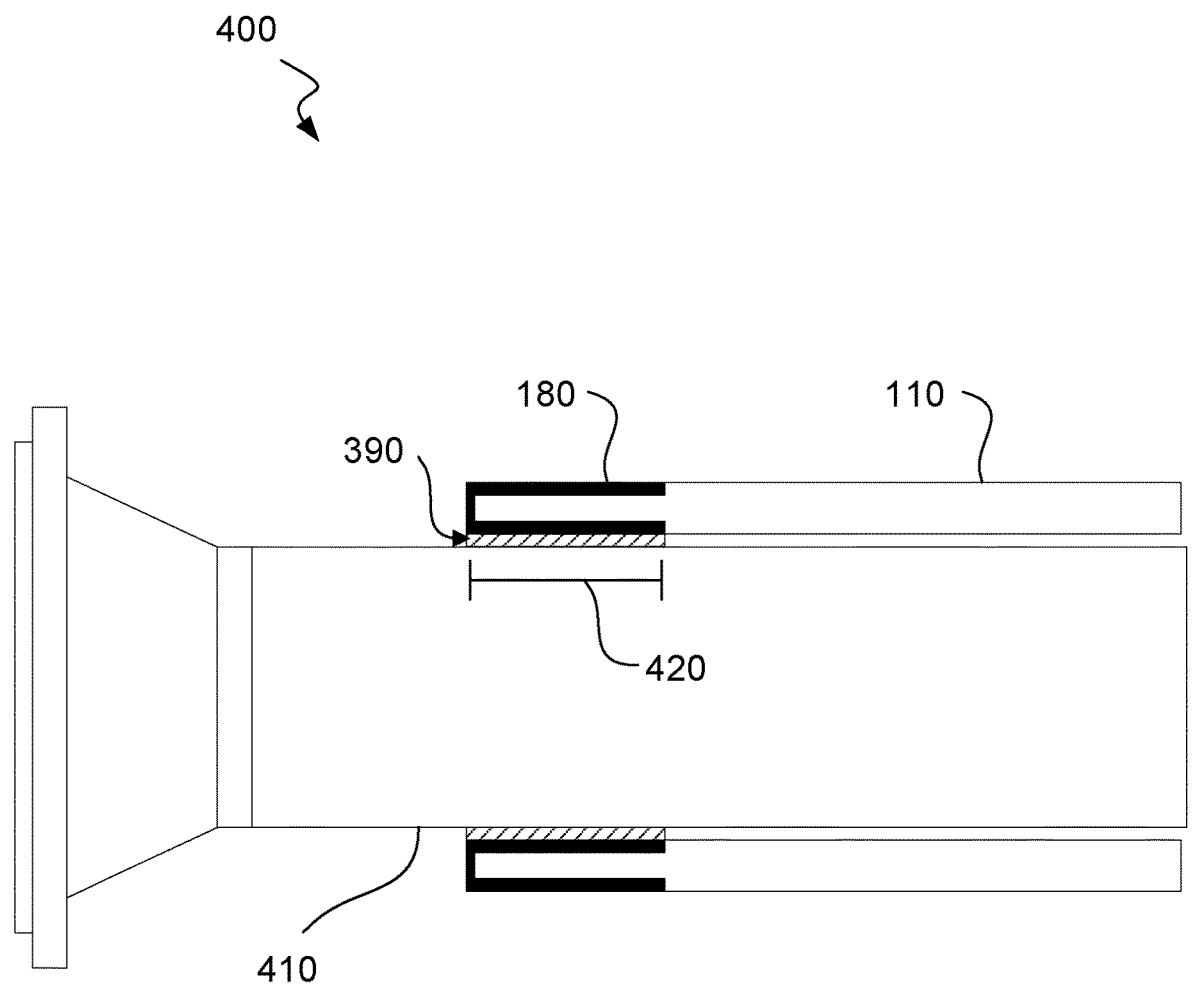
FIG. 4 is a cross-sectional view of an insulation segment with a pre-applied vapor-barrier stop sealed about a piping section.

FIG. 4 illustrates an embodiment 400 of an insulation segment 100 pre-treated with a vapor-barrier stop 180 sealed around a piping section 410. Some or all of the embodiments and components discussed in other Figures may be present in FIG. 4. As depicted in FIG. 4, a tubular core of insulating material 110 pre-treated with a vapor-barrier stop 180 may be sealed about a piping section 410. Installing the insulation segment 100 about a piping section 410 may consist of a plurality of steps. In some embodiments, sealing the slit 170 together may include applying the sealant 390 along some or all of the ledge surfaces 160 of the tubular core 110. In other embodiments, the ledge surfaces 160 of tubular core 110 are closed together without applying a sealant 390. In these embodiments, the sealant 390 may be applied along some or all of the cylindrical interior surface 130 to seal the cylindrical interior surface 130 to the surface of the piping section 410. The sealant 390 is preferably applied around an entire perimeter of the piping section 410 to ensure that the tubular core 110 is properly sealed to the piping section 410.

In some embodiments, the sealant 390 may be applied only along a distance 420 that the vapor-barrier stop 180 extends along the tubular core 110. In other embodiments, the sealant 390 may be applied along the entire length or a portion of the length of the tubular core 110. The distance 420 is the distance along the tubular core 110, including both the cylindrical exterior surface 120 and the cylindrical interior surface 130, that the vapor-barrier stop 180 extends, starting at the first end surface 140 and extending towards the second end surface 150. In some embodiments, the distance 420 that the vapor-barrier stop 180 extends may be more than two inches, and commonly between 2 and 8 inches, although a distance 420 of between 2 and 6 inches is more common. In other embodiments, the distance 420 that the vapor-barrier stop 180 extends may be at least four inches. In preferred embodiments, the distance 420 that the vapor-barrier stop 180 extends is approximately four inches.

Figure 5:
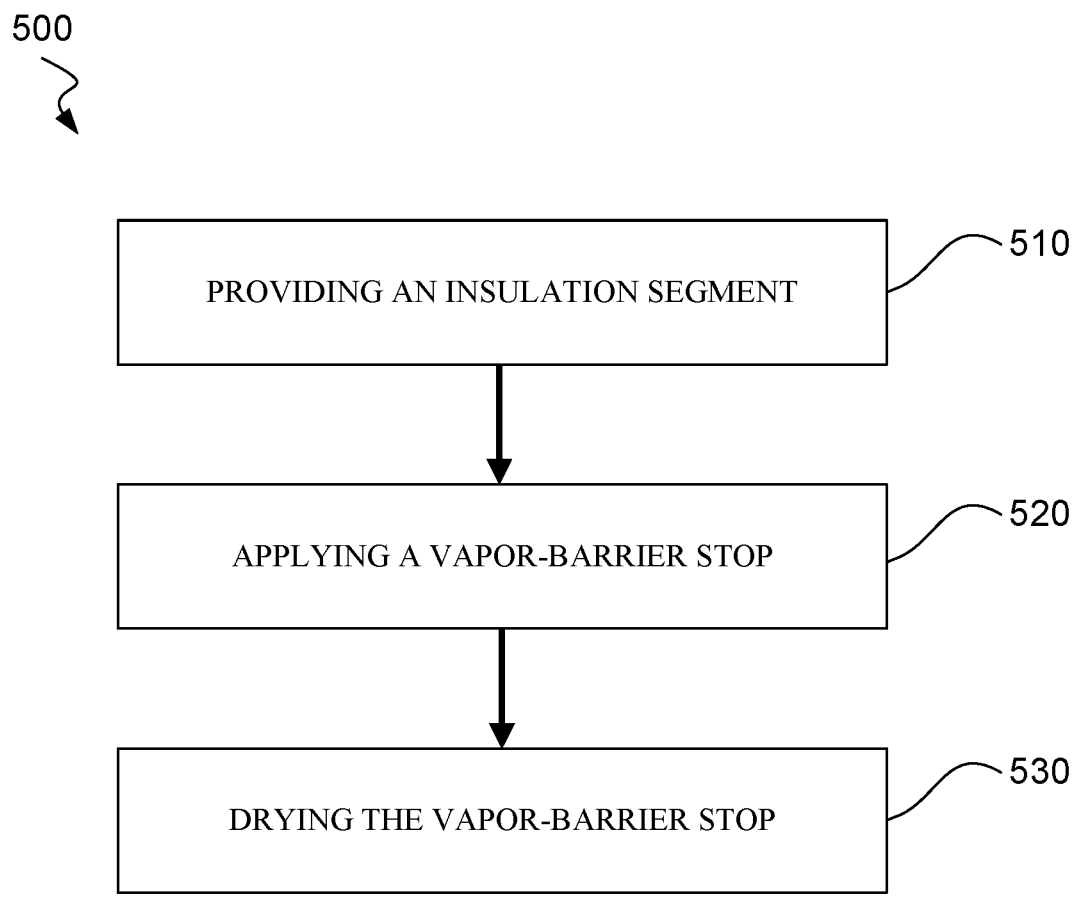
FIG. 5 is a flow chart of pre-treating an insulation segment with a vapor-barrier stop according to embodiments of the present invention.

FIG. 5 illustrates a method 500 for pre-treating an insulation segment 100 with a vapor-barrier stop 180. At block 510, an insulation segment 100 may be provided. The insulation segment 100 may consist of a single component of the tubular core of insulating material 110 or may consist of a plurality of insulation pieces that can nest together to form the tubular core of insulation material 110. The insulation segment 100 may include two clam shell insulation pieces, quadrant insulation pieces, or brick style insulation pieces. For method 500 of pre-treating the insulation segment 100, the insulation pieces may be treated individually prior to being nested together to form the tubular core 110.

At block 520, a vapor-barrier stop 180 may be applied to the insulation segment 100. The vapor-barrier stop 180 may be applied to at least the first end of the insulation segment 100 or may be applied to both ends of the insulation segment 100. Applying the vapor-barrier stop 180 may comprise coating the first end of insulation segment 100 with the vapor-barrier material. Coating the end of the insulation segment 100 with the vapor-barrier material may include a variety of application methods including dipping the end of the insulation segment 100 into the vapor-barrier material, spraying the vapor-barrier material onto the insulation segment 100, or brush coating the vapor-barrier material onto the insulation segment 100. The vapor-barrier stop 180 may comprise one or more layers of vapor-barrier material. Each of the one or more layers of vapor-barrier material may be imbedded with a reinforcing fabric.

At block 530, the vapor-barrier stop 180 may be cured or dried. Once the desired number of vapor-barrier material layers has been applied to the insulation segment 100, then the vapor-barrier stop 180 may be cured or dried. In some embodiments, each layer of vapor-barrier material may be dried or cured before application of a subsequent vapor-barrier material layer. Drying or curing the vapor-barrier stop 180 applied to insulation segment 100 may include various drying techniques known in the art. In some embodiments, the vapor-barrier stop 180 may dry or cure simply by sitting at ambient conditions. In other embodiments, drying or curing the vapor-barrier stop 180 may be accomplished through use of an oven or other drying/curing equipment.

Figure 6:
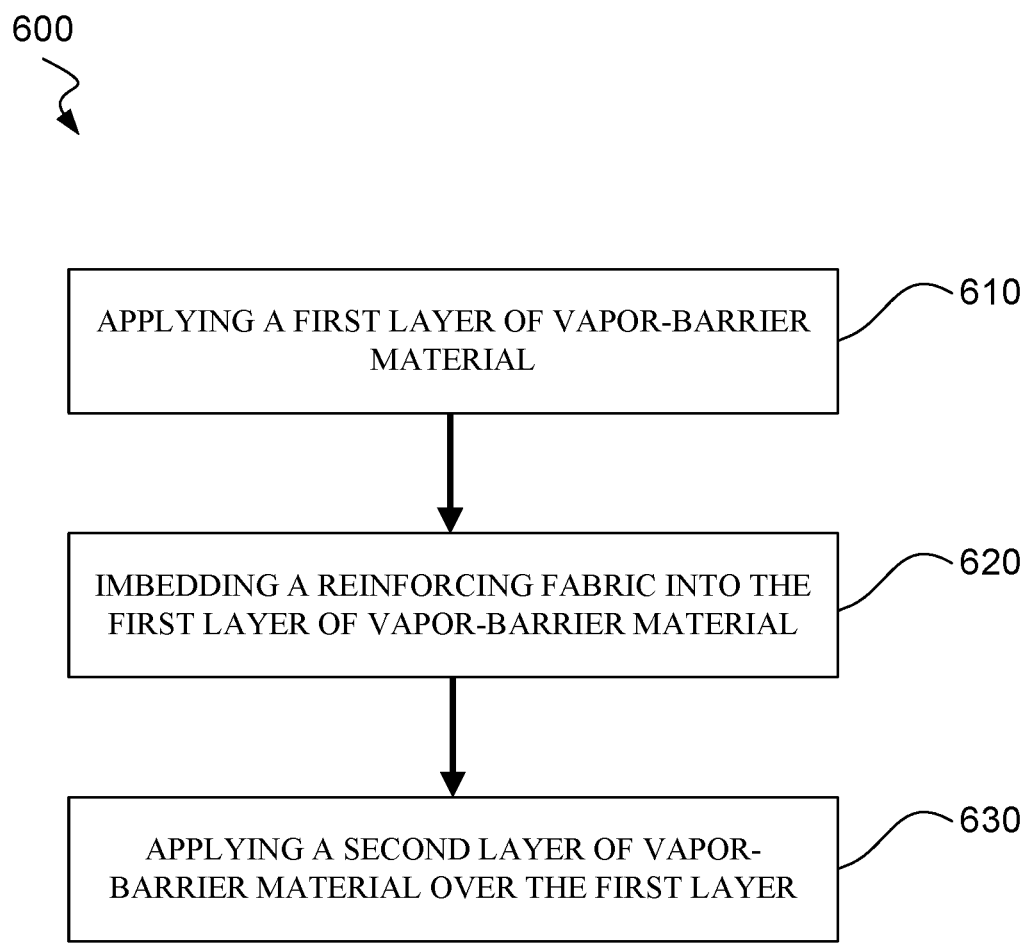
FIG. 6 is a flow chart of applying a vapor-barrier stop to an insulation segment according to embodiments of the present invention.

FIG. 6 illustrates a method 600 for applying a vapor-barrier stop 180 to an insulation segment 100. At block 610, a first layer of vapor-barrier material is applied to the insulation segment 100. The vapor-barrier material may be applied to at least the first end of the insulation segment 100. In other embodiments, the vapor-barrier material is applied to both the first and second end of the insulation segment 100. Applying the vapor-barrier material to the first end of the insulation segment may include covering the first end surface 140, the cylindrical exterior surface 120, the cylindrical interior surface 130, and the ledge surfaces 160 with the vapor-barrier material to form a uniform and continuous vapor barrier layer around the first end of the insulation segment 100.

After applying the vapor-barrier material to the first end of the insulation segment 100, excess vapor-barrier material may be removed. At block 620, a reinforcing fabric may be imbedded into the first layer of the vapor-barrier material. Prior to curing or drying the vapor-barrier material, the reinforcing fabric may be imbedded in the vapor-barrier material. In some embodiments, imbedding the reinforcing fabric may comprise co-applying the vapor-barrier material to the insulation segment with the reinforcing fabric, by for example, spraying on the vapor-barrier material with co-applied fibers or shrink wrapping film around the end of the insulation segment 100. In some embodiments, no reinforcing fabric may be imbedded or otherwise applied in the vapor-barrier material.

At block 630, a second layer of vapor-barrier material may be applied over the first layer of the vapor-barrier material. In some embodiments, the second layer of vapor-barrier material may be applied after the first layer of vapor-barrier material, which may or may not have reinforcing fabric imbedded into it, is cured or dried. In other embodiments, there may be two or more layers of vapor-barrier material applied to at least the first end of the insulation segment 100. The second layer of vapor-barrier material may be applied to the insulation segment 100 in a similar manner as the first layer of vapor-barrier material. For example, if the first layer was applied via dipping the end of the insulation segment 100 into a vat of vapor-barrier material, then the second layer may be applied via dipping the same end of the insulation segment 100 into the vat of vapor-barrier material. However, in other embodiments, different methods of applying the vapor-barrier material may be utilized for each layer of the vapor-barrier material. Similarly, the reinforcing fabric may be imbedded in some or all of the layers of vapor-barrier material.

Figure 7:
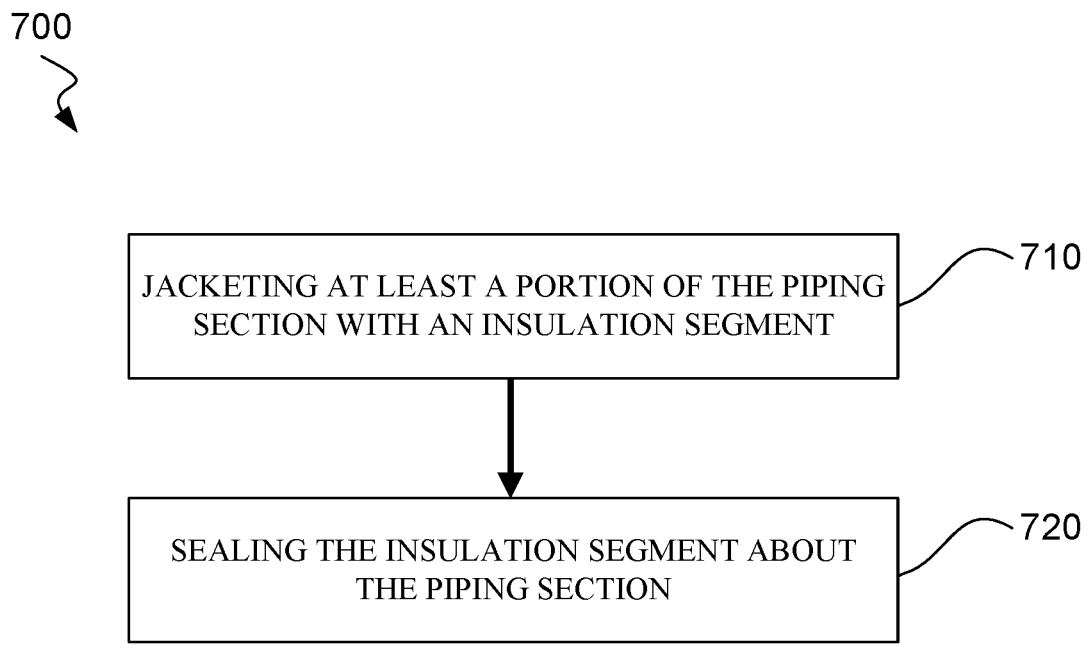
FIG. 7 is a flow chart of installing an insulation segment with a pre-applied vapor-barrier stop according to embodiments of the present invention.

FIG. 7 illustrates method 700 for installing an insulation segment 100 with a pre-applied vapor-barrier stop 180. At block 710, at least a portion of a piping section is jacketed with the insulation segment 100. In some embodiments, jacketing the piping section with the insulation segment 100 includes nesting together a plurality of insulation pieces to form the insulation segment 100. The plurality of insulation pieces may be nested together about the piping section to form the tubular core of insulation material 110 that circumferentially encapsulates the piping section. At block 720, the insulation segment 100 may be sealed about the piping section. Sealing the insulation segment 100 about the piping section may include applying the sealant 390 to the ledge surfaces 160 to seal together the respective ledge surfaces of the tubular core 110. In some embodiments, sealing the ledge surfaces 160 with the sealant 390 may including applying the sealant 390 to the ledge surfaces 160 of the insulation pieces and nesting together the plurality of insulation pieces to form the tubular core 110. In other embodiments, the sealant 390 is applied to the cylindrical interior surface 130 of the insulation segment 100 and the insulation segment 100 is sealed directly to the piping section. In such embodiments, the sealant 390 is typically applied around the entire outer circumference or periphery of the piping section.

Figure 8:
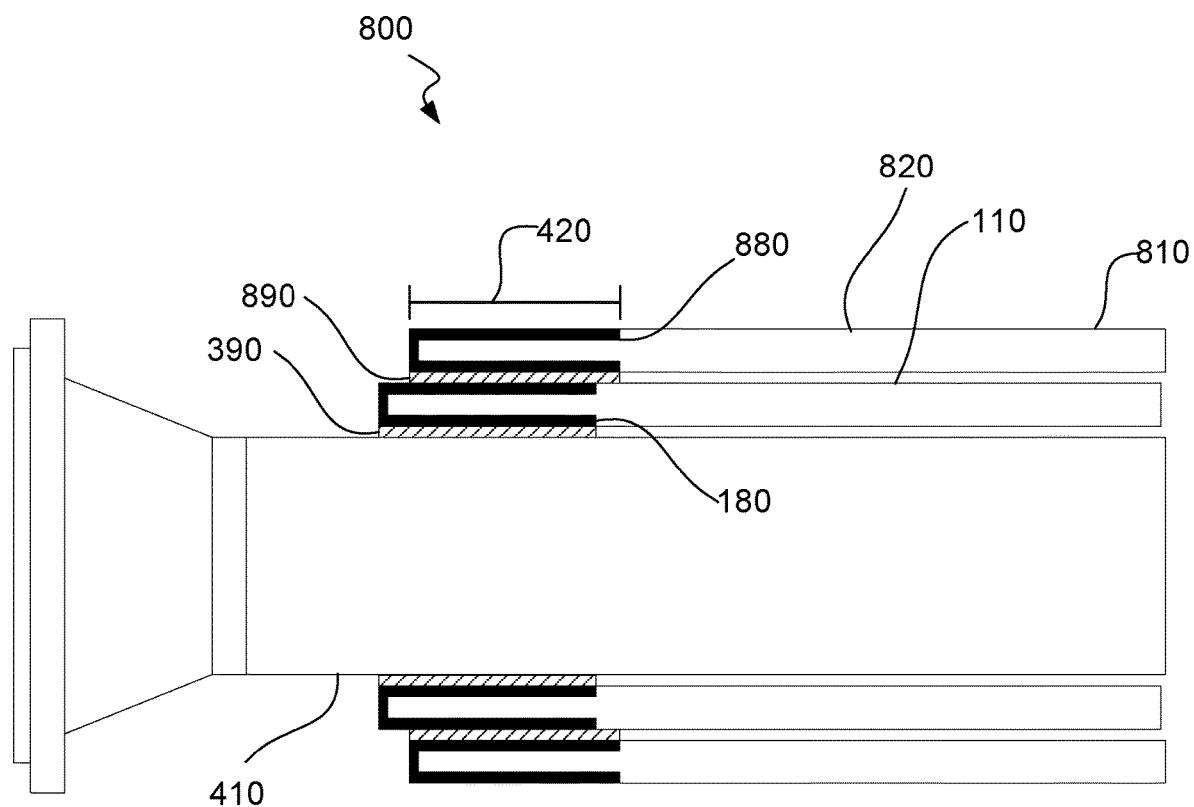
FIG. 8 is a cross-sectional view of a piping section, wherein the piping section is jacketed by two insulation segments with pre-applied vapor-barrier stops.

FIG. 8 illustrates an embodiment of the present invention comprising a second insulation segment 800 with a pre-applied vapor-barrier stop 880 applied over the insulation segment 100 that is the first insulation segment with the pre-applied vapor-barrier stop 180. Some or all of the embodiments and components discussed in other Figures may be present in FIG. 8. The second insulation segment 800 may include a tubular core of an insulating material 810 that may include a second substantially cylindrical exterior surface 820 and a second substantially cylindrical interior surface (not labeled). Extending between the second cylindrical exterior surface 820 and the second cylindrical interior surface may be a wall of insulating material. In some embodiments, the cylindrical exterior surface 820 may comprise a vapor-barrier facer, similar to the vapor-barrier facer discussed above with reference to the tubular core 110.

The second cylindrical interior surface may be configured to correspond with the specific diameter of the cylindrical exterior surface 120 of the insulation segment 100. The second tubular core 810 may include a longitudinally extending second slit (not labeled) that passes completely through the wall of the insulating material on one side and into the interior of the second cylindrical interior surface so that the second tubular core 810 can be opened, passed over, and closed about the insulation segment 100. The second slit may include at least two shelf surfaces. In some embodiments, the two shelf surfaces are the same as the two ledge surfaces.

In some embodiments, the second insulation segment 800 may be contain and possess all the same characteristics and properties as the insulation segment 100. Thus, the second insulation segment 800 may comprise a single tubular core of insulating material 110 as illustrated, for example, in FIG. 1. In other embodiments, insulation segment 800 may comprise a plurality of insulation pieces that nest together to form the tubular core of insulation material 810 as illustrated in and discussed with reference to, for example, FIG. 2A and FIG. 2B.

In some embodiments, the second vapor-barrier stop 880 may be characterized with the same properties and components as the vapor-barrier stop 180. Thus, the second vapor-barrier stop 880 may be applied to the second insulation segment 880 in methods and embodiments described in FIGS. 1, 2A, and 2B. For example, the second vapor-barrier stop 880 may be applied to one or both ends of the insulation segment 800. The second vapor-barrier stop 880 may be applied to at least the first end of the second insulation segment 800. Applying the second vapor-barrier stop 880 to the first end of the second insulation segment 800 may comprise extending the second vapor-barrier stop 880 over the primary end surface 820, the second cylindrical interior surface (not labeled), the second cylindrical exterior surface (not labeled), and the shelf surfaces (not labeled). The vapor-barrier stop 880 may extend continuously about the end of the second tubular core 810 to form a continuous vapor barrier and may impede vapor exchange both from and to the external environment.

Once the vapor-barrier stop 880 has been applied to the second tubular core 810, the second tubular core 810 may be sealed to the insulation segment 100. Sealing the second insulation segment 800 to the insulation segment 100, which is the first insulation segment, may comprise applying a second sealant 890 along the second cylindrical interior surface of the second tubular core 810 to seal the second tubular core 810 to the insulation segment 100. In some embodiments, the second sealant 890 may be applied only to the distance 420 that the second vapor-barrier material extends along the length of the second tubular core 810. While in other embodiments, the second sealant 890 may be applied to a portion or all of the length of the second insulation segment 800.

In other embodiments, the second sealant 890 may be applied along the shelf surfaces of the second insulation segment 800 to seal the second tubular core 810 together or to seal the nested insulation pieces that comprise the second tubular core 810 together. In various embodiments, the second sealant 890 may be applied to both the shelf surfaces and the second cylindrical interior surface of the second tubular core 810, or may be applied to just the second cylindrical interior surface. The second sealant 890 may be characterized and contain all or some of the properties as the sealant 390. The second sealant 890 is preferably applied around an entire perimeter of an outer surface of the insulating material 110 to ensure that the second tubular core 810 is properly sealed to the insulating material 110. The sealing material 390 is also preferably applied around an entire periphery of the exterior surface of the piping section 410 to ensure that the insulation material 110 is properly sealed to the piping section 410.

Aspects of the invention have now been described in detail for the purposes of clarity and understanding. However, it will be appreciated that certain changes and modifications may be practiced within the scope of the appended claims.

While several embodiments and arrangements of various components are described herein, it should be understood that the various components and/or combination of components described in the various embodiments may be modified, rearranged, changed, adjusted, and the like. For example, the arrangement of components in any of the described embodiments may be adjusted or rearranged and/or the various described components may be employed in any of the embodiments in which they are not currently described or employed. As such, it should be realized that the various embodiments are not limited to the specific arrangement and/or component structures described herein.

In addition, it is to be understood that any workable combination of the features and elements disclosed herein is also considered to be disclosed. Additionally, any time a feature is not discussed with regard in an embodiment in this disclosure, a person of skill in the art is hereby put on notice that some embodiments of the invention may implicitly and specifically exclude such features, thereby providing support for negative claim limitations.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A vapor-barrier stop pre-treated piping insulation system comprising:
a piping section;
an insulation segment, having a length and a longitudinal axis, configured to extend longitudinally about at least a portion of the piping section to insulate the piping section, wherein the insulation segment comprises:
a substantially cylindrical interior surface,
a substantially cylindrical exterior surface,
a first end surface and a second end surface, and
a wall extending between the cylindrical exterior surface and the cylindrical interior surface, the wall of the insulation segment having a radially extending thickness, the wall of the insulation having a slit extending completely there through, the slit extending parallel to the longitudinal axis of the insulation segment for the length of the insulation segment, wherein the slit comprises at least two ledge surfaces; and
a vapor-barrier stop extending over the insulation segment starting from at least the first end surface and extending over the cylindrical interior surface, the cylindrical exterior surface, the at least two ledge surfaces, and at least the first end surface to a distance along the length of the insulation segment, wherein the vapor-barrier stop impedes vapor exchange through the vapor-barrier stop; and
a sealant applied to provide a seal between the insulation segment and the piping section and/or a seal between the ledge surfaces;
wherein the insulation segment comprises a plurality of insulation pieces configured to nest together to form the insulation segment; and
wherein at least one of the plurality of insulation pieces comprises a vapor-barrier facer.

2. The vapor-barrier stop pre-treated piping insulation system of claim 1, wherein the substantially cylindrical exterior surface of the insulation segment further comprises a vapor-barrier facer.

3. The vapor-barrier stop pre-treated piping insulation system of claim 1, wherein the plurality of insulation pieces are configured to nest together in a stair step fashion to form the insulation segment.

4. The vapor-barrier stop pre-treated piping insulation system of claim 1, wherein the insulation segment is a first insulation segment and wherein the pre-treated piping insulation system further comprises:
a second insulation segment, wherein the second insulation segment, having a length and a longitudinal axis, is configured to extend longitudinally about at least a portion of the insulation segment to further insulate the piping section, and wherein the second insulation segment comprises:
a second substantially cylindrical interior surface,
a second substantially cylindrical exterior surface,
a primary end surface and a secondary end surface, and
a second wall extending between the second cylindrical exterior surface and the second cylindrical interior surface, the second wall of the second insulation segment having a radially extending thickness, the second wall of the second insulation having a second slit extending completely there through, the second slit extending parallel to the longitudinal axis of the second insulation segment for the length of the second insulation segment, wherein the second slit comprises at least two shelf surfaces; and
a second vapor-barrier stop applied prior to installation of the second insulation segment on the first insulation segment, wherein the second vapor-barrier stop extends over the second insulation segment starting from at least the primary end surface and extends over the second cylindrical interior surface, the second cylindrical exterior surface, the at least two shelf surfaces, and at least the primary end surface to a distance along the length of the second insulation segment, wherein the second vapor-barrier stop impedes vapor exchange through the second vapor-barrier stop; and
a second sealant applied to provide a seal between the second insulation segment and the first insulation segment.

5. The vapor-barrier stop pre-treated piping insulation system of claim 1, wherein the sealant is a 100% solid sealant.

6. An insulation segment with a pre-applied vapor-barrier stop comprising:
an insulation segment, having a length, a diameter, and a longitudinal axis, configured to extend longitudinally about at least a portion of a piping section to insulate the piping section, wherein the insulation segment comprises:
a substantially cylindrical interior surface,
a substantially cylindrical exterior surface,
a first end surface and a second end surface, and
a wall extending between the cylindrical exterior surface and the cylindrical interior surface, the wall of the insulation segment having a radially extending thickness, the wall of the insulation having a slit extending completely there through, the slit extending parallel to the longitudinal axis of the insulation segment for the length of the insulation segment, wherein the slit comprises at least two ledge surfaces; and
a vapor-barrier stop applied prior to installation of the insulation segment on the piping section, extending over the insulation segment starting from at least the first end surface and extending over the cylindrical interior surface, the cylindrical exterior surface, the at least two ledge surfaces, and at least the first end surface to a distance along the length of the insulation segment, wherein the vapor-barrier stop impedes vapor exchange through the vapor-barrier stop and comprises:
a first layer of vapor-barrier material,
a reinforcing fabric imbedded in the first layer of the vapor-barrier material, and
a second layer of vapor-barrier material positioned atop the first layer; and
wherein the insulation segment is configured to install with a sealant to seal the insulation segment.

7. The vapor-barrier stop pre-treated piping insulation system of claim 6, wherein the substantially cylindrical exterior surface comprises a vapor-barrier facer and the vapor-barrier stop ideally overlaps and seals onto the vapor-barrier facer to create a continuous vapor barrier.

8. The insulation segment with a pre-applied vapor-barrier stop of claim 6, wherein the insulation segment further comprises at least a plurality of insulation pieces configured to nest together to form the insulation segment.

9. The insulation segment with a pre-applied vapor-barrier stop of claim 8, wherein at least one of the at least plurality of insulation pieces comprises a vapor-barrier facer.

10. The insulation segment with a pre-applied vapor-barrier stop of claim 8, wherein the plurality of insulation pieces are configured to nest together in a stair step fashion to form the insulation segment.

11. The insulation segment with a pre-applied vapor-barrier stop of claim 6, wherein the vapor-barrier stop further comprises a second reinforcing fabric imbedded in the second layer of the vapor-barrier material.

12. The insulation segment with a pre-applied vapor-barrier stop of claim 6, wherein the vapor-barrier material comprises a resin material.

13. The insulation segment with a pre-applied vapor-barrier of claim 12, wherein the resin material comprises a mastic.

14. The insulation segment with a pre-applied vapor-barrier of claim 13, wherein the resin material is a butyl polymer.

15. The insulation segment with a pre-applied vapor-barrier stop of claim 6, wherein the diameter of the insulation segment taken over the cylindrical exterior surface remains substantially the same as a diameter of the insulation segment extended over the cylindrical exterior surface by the vapor-barrier stop.

16. The insulation segment with a pre-applied vapor-barrier stop of claim 15, wherein the diameter of the insulation segment extended over the cylindrical exterior surface by the vapor-barrier stop remains substantially the same as the diameter of the insulation segment taken over the cylindrical exterior surface when the diameter of the insulation segment extended over the cylindrical exterior surface by the vapor-barrier stop is about 0.12 inches greater than the diameter of the insulation segment taken over the cylindrical exterior surface.

17. A method of pre-treating an insulation segment with a vapor-barrier stop comprising:
   providing an insulation segment, having a length and a longitudinal axis, configured to extend longitudinally about at least a portion of the piping section to insulate the piping section, wherein the insulation segment comprises:
      a substantially cylindrical interior surface,
      a substantially cylindrical exterior surface,
      a first end surface and a second end surface, and
      a wall extending between the cylindrical exterior surface and the cylindrical interior surface, the wall of the insulation segment having a radially extending thickness, the wall of the insulation having a slit extending completely there through, the slit extending parallel to the longitudinal axis of the insulation segment for the length of the insulation segment, wherein the slit comprises at least two ledge surfaces;
   applying a vapor-barrier stop applied prior to installation of the insulation segment on the piping section, wherein the vapor-barrier stop extends over the insulation segment starting from at least the first end surface and extends over the cylindrical interior surface, the cylindrical exterior surface, the at least two ledge surfaces, and at least the first end surface to a distance along the length of the insulation segment, wherein the vapor-barrier stop impedes vapor exchange through the vapor-barrier stop; and
   drying the vapor-barrier stop;
   wherein applying the vapor-barrier stop comprises:
      applying a first layer of vapor-barrier material;
      imbedding a reinforcing fabric into the first layer of vapor-barrier material; and
      applying a second layer of vapor-barrier material over the first layer imbedded with the reinforcing fabric.

18. The method of pre-treating an insulation segment with a vapor-barrier stop of claim 17, wherein applying the vapor-barrier stop comprises coating the insulation segment with a vapor-barrier material.

19. The method of pre-treating an insulation segment with a vapor-barrier stop of claim 17, wherein applying the vapor-barrier stop comprises dipping the insulation segment into a vapor-barrier material.

20. The method of pre-treating an insulation segment with a vapor-barrier stop of claim 17, wherein the applying the vapor-barrier stop further comprises:
   imbedding a second reinforcing fabric into the second layer of vapor-barrier material.

21. A method of installing an insulation segment with a pre-applied vapor-barrier stop comprising:
   jacketing at least a portion of a piping section with an insulation segment, wherein the insulation segment, having a length and a longitudinal axis, is configured to extend longitudinally about at least a portion of the piping section to insulate the piping section, and wherein the insulation segment comprises:
      a substantially cylindrical interior surface,
      a substantially cylindrical exterior surface,
      a first end surface and a second end surface,
      a wall extending between the cylindrical exterior surface and the cylindrical interior surface, the wall of the insulation segment having a radially extending thickness, the wall of the insulation having a slit extending completely there through, the slit extending parallel to the longitudinal axis of the insulation segment for the length of the insulation segment, wherein the slit comprises at least two ledge surfaces; and
   a vapor-barrier stop applied prior to jacketing the piping section with the insulation segment, wherein the vapor-barrier stop extends over the insulation segment starting from at least the first end surface and extending over the cylindrical interior surface, the cylindrical exterior surface, the at least two ledge surfaces, and at least the first end surface to a distance along the length of the insulation segment, wherein the vapor-barrier stop impedes vapor exchange through the vapor-barrier stop; and
   sealing the insulation segment about the piping section with a sealant, wherein the sealant is applied to provide a seal between the insulation segment and the piping section.

22. The method of installing the insulation segment with a pre-applied vapor-barrier stop of claim 21, wherein jacketing at least a portion of the piping section with an insulation segment comprises nesting together a plurality of insulation pieces to form the insulation segment, wherein the plurality of insulation are configured to nest together to form the insulation segment.

23. The method of installing an insulation segment with a pre-applied vapor-barrier stop of claim 21, wherein the method further comprises:
   jacketing the insulation segment that is a first insulation segment with a second insulation segment, wherein the second insulation segment, having a length and a longitudinal axis, is configured to extend longitudinally about at least a portion of the insulation segment to further insulate the piping section, and wherein the second insulation segment comprises:

a second substantially cylindrical interior surface,
a second substantially cylindrical exterior surface,
a primary end surface and a secondary end surface,
a second wall extending between the second cylindrical exterior surface and the second cylindrical interior surface, the second wall of the second insulation segment having a radially extending thickness, the second wall of the second insulation having a second slit extending completely there through, the second slit extending parallel to the longitudinal axis of the second insulation segment for the length of the second insulation segment, wherein the second slit comprises at least two shelf surfaces; and a second vapor-barrier stop applied prior to jacketing the first insulation segment with the second insulation segment, wherein the second vapor-barrier stop extends over the second insulation segment starting from at least the primary end surface and extending over the second cylindrical interior surface, the second cylindrical exterior surface, the at least two shelf surfaces, and at least the primary end surface to a distance along the length of the second insulation segment, wherein the second vapor-barrier stop impedes vapor exchange through the second vapor-barrier stop; and sealing the second insulation segment about the first insulation segment with a sealant, wherein the sealant is applied to provide a seal between the second insulation segment and the first insulation segment.

* * * * *